United States Patent
Ogawa

(10) Patent No.: US 10,838,618 B2
(45) Date of Patent: Nov. 17, 2020

(54) WORK MACHINE DISPLAY DEVICE

(71) Applicant: FUJI CORPORATION, Chiryu (JP)

(72) Inventor: Masashi Ogawa, Toyota (JP)

(73) Assignee: FUJI CORPORATION, Chiryu (JP)

( * ) Notice: Subject to any disclaimer, the term of this patent is extended or adjusted under 35 U.S.C. 154(b) by 220 days.

(21) Appl. No.: 15/125,411

(22) PCT Filed: Mar. 13, 2014

(86) PCT No.: PCT/JP2014/056735
§ 371 (c)(1),
(2) Date: Sep. 12, 2016

(87) PCT Pub. No.: WO2015/136671
PCT Pub. Date: Sep. 17, 2015

(65) Prior Publication Data
US 2017/0075567 A1    Mar. 16, 2017

(51) Int. Cl.
*G06F 3/048*     (2013.01)
*G05B 19/409*    (2006.01)
*G06F 3/0488*    (2013.01)
*G06F 3/0481*    (2013.01)
*G05B 19/042*    (2006.01)

(52) U.S. Cl.
CPC ....... *G06F 3/04886* (2013.01); *G05B 19/409* (2013.01); *G06F 3/04817* (2013.01); *G05B 19/0426* (2013.01); *G05B 2219/13031* (2013.01)

(58) Field of Classification Search
CPC ........ G05B 19/409; G05B 2219/13031; G06F 3/0481–0489; G06F 3/04886; G06F 3/04817
See application file for complete search history.

(56) References Cited

U.S. PATENT DOCUMENTS

| | | | | |
|---|---|---|---|---|
| 4,811,240 A | * | 3/1989 | Ballou | G06F 3/0488 715/202 |
| 5,485,620 A | * | 1/1996 | Sadre | G05B 19/41865 700/18 |
| 5,576,946 A | * | 11/1996 | Bender | G05B 19/41865 700/17 |
| 5,900,877 A | * | 5/1999 | Weiss | G06F 3/04847 715/803 |

(Continued)

FOREIGN PATENT DOCUMENTS

| JP | 10-187222 A | 7/1998 |
|---|---|---|
| JP | 2000-315105 A | 11/2000 |

(Continued)

OTHER PUBLICATIONS

Machine translation of JP2001-125605A, retrieved from https://www4.j-platpat.inpit.go.jp on Apr. 1, 2018; 11 pages. (Year: 2001).*

(Continued)

*Primary Examiner* — Steven B Theriault
(74) *Attorney, Agent, or Firm* — Oblon, McClelland, Maier & Neustadt, L.L.P.

(57) ABSTRACT

A work machine display device is provided with a touch panel which displays software buttons and operation conditions which are necessary for selecting the software buttons at the same time in a state in which the software buttons and the operation conditions are related.

18 Claims, 9 Drawing Sheets

(56) References Cited

U.S. PATENT DOCUMENTS

| | | | | |
|---|---|---|---|---|
| 5,984,503 A * | 11/1999 | Strickland | G05B 19/409 | 318/569 |
| 6,031,535 A * | 2/2000 | Barton | G06F 3/0482 | 715/840 |
| 6,243,089 B1 * | 6/2001 | Gong | G06F 17/30902 | 707/E17.12 |
| 6,523,045 B1 * | 2/2003 | Beatty | G06Q 10/04 | |
| 6,677,966 B2 * | 1/2004 | Thorgeirsson | H04N 21/431 | 715/810 |
| 6,806,893 B1 * | 10/2004 | Kolawa | G06F 3/04817 | 715/836 |
| 7,187,394 B2 * | 3/2007 | Chandane | G06F 3/04886 | 715/762 |
| 7,949,501 B1 * | 5/2011 | Iravani | G05B 19/41885 | 703/6 |
| 8,041,768 B2 * | 10/2011 | Wu | H04L 29/06027 | 709/206 |
| 8,359,536 B2 * | 1/2013 | Herpel | G11B 19/025 | 715/719 |
| 8,645,866 B2 * | 2/2014 | Nestler | G06F 9/451 | 715/837 |
| 8,661,170 B2 * | 2/2014 | Sato | G06F 8/65 | 710/14 |
| 9,137,401 B2 * | 9/2015 | Kawakami | H04N 1/00498 | |
| 9,146,628 B2 * | 9/2015 | Wakizaka | G06F 3/041 | |
| 9,330,121 B2 * | 5/2016 | Sayers | G06F 16/219 | |
| 9,618,972 B2 * | 4/2017 | DeLuca | G06F 1/1637 | |
| 9,983,575 B2 * | 5/2018 | Nixon | G05B 23/0267 | |
| 10,013,149 B2 * | 7/2018 | Nixon | G06F 3/0484 | |
| 2002/0008691 A1 * | 1/2002 | Hanajima | G06F 3/04847 | 345/173 |
| 2002/0054101 A1 * | 5/2002 | Beatty | G06Q 10/06 | 715/764 |
| 2002/0087489 A1 * | 7/2002 | Iizuka | G06Q 30/0283 | 705/400 |
| 2003/0030823 A1 * | 2/2003 | Kruse | G06F 3/1205 | 358/1.6 |
| 2003/0033105 A1 * | 2/2003 | Yutkowitz | G05B 19/404 | 702/105 |
| 2003/0195926 A1 * | 10/2003 | Miyazaki | H04N 1/00236 | 709/203 |
| 2004/0051746 A1 * | 3/2004 | Hejza Litwiller | G03G 15/5016 | 715/865 |
| 2004/0119756 A1 * | 6/2004 | Kumhyr | G06F 9/451 | 715/837 |
| 2004/0169673 A1 * | 9/2004 | Crampe | A61B 17/1757 | 715/700 |
| 2004/0210868 A1 * | 10/2004 | Dutsch | G05B 19/056 | 717/113 |
| 2004/0229671 A1 * | 11/2004 | Stronach | G06Q 50/34 | 463/6 |
| 2005/0021553 A1 * | 1/2005 | Romijn | G06F 16/3325 | |
| 2005/0154767 A1 * | 7/2005 | Sako | A61B 6/00 | |
| 2005/0179929 A1 * | 8/2005 | Jain | G06F 21/608 | 358/1.14 |
| 2005/0210406 A1 * | 9/2005 | Biwer | G06Q 10/10 | 715/804 |
| 2005/0254850 A1 * | 11/2005 | Bardolatzy | G03G 15/00 | 399/81 |
| 2006/0005140 A1 * | 1/2006 | Crew | G06Q 10/06 | 715/760 |
| 2006/0046238 A1 * | 3/2006 | DeGregory | G09B 7/02 | 434/350 |
| 2006/0107235 A1 * | 5/2006 | Esaki | G06F 3/04845 | 715/824 |
| 2006/0168530 A1 * | 7/2006 | Muller | G06Q 10/10 | 715/751 |
| 2006/0184972 A1 * | 8/2006 | Rafey | G06F 21/10 | 725/80 |
| 2006/0242590 A1 * | 10/2006 | Polivy | G06F 17/30905 | 715/760 |
| 2006/0252542 A1 * | 11/2006 | Nicely | G07F 17/32 | 463/36 |
| 2006/0271874 A1 * | 11/2006 | Raiz | G06F 9/451 | 715/767 |
| 2007/0177194 A1 * | 8/2007 | Yamaguchi | H04N 1/0048 | 358/1.15 |
| 2007/0245264 A1 * | 10/2007 | Hoerentrup | G06F 3/0482 | 715/835 |
| 2007/0282997 A1 * | 12/2007 | Trochman | G08C 19/00 | 709/224 |
| 2008/0016452 A1 * | 1/2008 | Pincus | H02J 13/00001 | 715/763 |
| 2008/0059616 A1 * | 3/2008 | Shizuno | H04L 29/12301 | 709/222 |
| 2008/0285073 A1 * | 11/2008 | Sawayanagi | G06F 3/1208 | 358/1.15 |
| 2009/0031254 A1 * | 1/2009 | Herpel | G11B 19/025 | 715/840 |
| 2009/0051665 A1 * | 2/2009 | Jang | G06F 3/0482 | 345/173 |
| 2009/0113328 A1 * | 4/2009 | Leonard | G06F 3/04817 | 715/765 |
| 2009/0187457 A1 * | 7/2009 | Sze | G06Q 30/04 | 705/50 |
| 2010/0017738 A1 * | 1/2010 | Rhodes | G06Q 10/06 | 715/772 |
| 2010/0033744 A1 * | 2/2010 | Maeda | H04N 1/00204 | 358/1.9 |
| 2010/0083108 A1 * | 4/2010 | Rider | G06F 3/04883 | 715/702 |
| 2010/0095244 A1 * | 4/2010 | Horentrup | G06F 3/0482 | 715/823 |
| 2010/0115470 A1 * | 5/2010 | Tanji | G06F 9/5038 | 715/840 |
| 2010/0141104 A1 * | 6/2010 | Beaudet | A47L 15/4293 | 312/228 |
| 2010/0169833 A1 * | 7/2010 | Arima | A61B 6/465 | 715/821 |
| 2010/0172680 A1 * | 7/2010 | Butcher | G06F 3/1205 | 400/76 |
| 2010/0226733 A1 * | 9/2010 | Ilda | B42B 5/08 | 412/1 |
| 2010/0291992 A1 * | 11/2010 | Greenberg | G07F 17/32 | 463/25 |
| 2011/0055719 A1 * | 3/2011 | Mori | G06F 3/0483 | 715/747 |
| 2011/0320477 A1 * | 12/2011 | Nestler | G06F 9/451 | 707/769 |
| 2012/0054620 A1 * | 3/2012 | Tilley | G06F 1/1626 | 715/727 |
| 2012/0069373 A1 * | 3/2012 | Tomiyasu | G03G 15/502 | 358/1.13 |
| 2012/0079409 A1 * | 3/2012 | Luo | G06F 8/34 | 715/772 |
| 2012/0083906 A1 * | 4/2012 | Weatherhead | G05B 23/0267 | 700/83 |
| 2012/0124504 A1 * | 5/2012 | Maybee | G06F 8/34 | 715/772 |
| 2012/0225677 A1 * | 9/2012 | Forstall | G01C 21/12 | 455/456.6 |
| 2012/0307302 A1 * | 12/2012 | Furukawa | H04N 1/00222 | 358/1.15 |
| 2012/0320421 A1 * | 12/2012 | Van Vonderen | H04N 1/32486 | 358/1.15 |
| 2013/0246904 A1 * | 9/2013 | Seliger | G06F 3/0481 | 715/234 |
| 2014/0129002 A1 * | 5/2014 | Brandes | G05B 19/0426 | 700/83 |
| 2014/0147335 A1 * | 5/2014 | Sarwar | G01N 35/00722 | 422/63 |
| 2014/0208957 A1 * | 7/2014 | Imai | H05B 6/6435 | 99/342 |
| 2014/0215342 A1 * | 7/2014 | Watanabe | G06F 3/04886 | 715/732 |
| 2014/0258928 A1 * | 9/2014 | Brush | B60Q 1/0076 | 715/810 |

(56) References Cited

U.S. PATENT DOCUMENTS

| | | | |
|---|---|---|---|
| 2014/0277620 A1* | 9/2014 | Nixon | G05B 23/0216 |
| | | | 700/83 |
| 2014/0282195 A1* | 9/2014 | Nixon | G05B 23/0216 |
| | | | 715/771 |
| 2015/0002422 A1* | 1/2015 | Chen | G06F 3/04883 |
| | | | 345/173 |
| 2015/0153575 A1* | 6/2015 | Komatsu | G02B 27/0172 |
| | | | 345/8 |
| 2015/0382136 A1* | 12/2015 | Mihira | H04W 12/06 |
| | | | 455/41.1 |
| 2016/0334981 A1* | 11/2016 | Shimizu | G05B 19/056 |
| 2016/0353543 A1* | 12/2016 | Twaddell | H05B 33/0854 |

FOREIGN PATENT DOCUMENTS

| | | | |
|---|---|---|---|
| JP | 2001-88068 A | | 4/2001 |
| JP | 2001-125605 A | | 5/2001 |
| JP | 2001125605 A | * | 5/2001 |
| JP | 2006-338708 A | | 12/2006 |

OTHER PUBLICATIONS

International Search Report dated Apr. 8, 2014 in PCT/JP2014/056735 filed Mar. 13, 2014.

* cited by examiner

WORK MACHINE DISPLAY DEVICE

TECHNICAL FIELD

The present application relates to a work machine display device which is used to display an operational status of a work machine or the like, for example.

BACKGROUND ART

The operational status and the like of a machine tool are displayed on a touch panel of an operation panel of the machine tool. Software buttons are displayed on the touch panel. There is a case in which operation conditions which are necessary for selecting the software button are set in the software button. In a case in which all of the operation conditions are satisfied, the software button is displayed on the touch panel in a selectable state. Meanwhile, in a case in which at least one of the operation conditions is not satisfied, the software button is displayed on the touch panel in a non-selectable state. Therefore, it is possible for a worker to determine whether it is possible to select the software button by confirming the software button.

CITATION LIST

Patent Literature

PTL 1: JP-A-2000-315105

SUMMARY

In a case in which the software button is in the non-selectable state, it is necessary for the worker to satisfy all of the predetermined operation conditions which are necessary for setting the software button to the selectable state. However, the worker may not be able to ascertain which operation conditions are lacking merely by viewing the touch panel. Therefore, it is necessary for the worker to investigate the operation conditions which are lacking using a manual or the like. Such work is arduous.

On this point, PTL 1 discloses an NC (Numerical Control) machine tool management system in which usability during remote operation is favorable. According to the management system described in the document, it is possible to display icons which correspond to an operational state (stopped ordinarily, operating ordinarily, stopped by a minor error, stopped by a serious error, power off) of the NC machine tool on a screen of a personal computer. However, even in the case of the management system of this document, the content which may be displayed on the screen is limited to the operational state of the NC machine tool. Therefore, an object of the present disclosure is to provide a work machine display device capable of improving the usability of a work machine.

(1) In order to solve the problems described above, a work machine display device of the present disclosure is provided with a touch panel which displays a software button and an operation condition which is necessary for selecting the software button at the same time in a state in which the software button and the operation condition are related. Here, a "software button" refers to a button which is displayed (rendered) on a touch panel and with which a worker is capable of inputting predetermined commands.

According to the work machine display device of the present disclosure, it is possible to display the software buttons and the operation conditions on the touch panel at the same time. In addition, it is possible to display the software buttons and the operation conditions in an interrelated state. The worker is capable of confirming the state (the selectable state or the non-selectable state) of a desired software button by merely viewing the touch panel. At the same time, in a case in which the desired software button is in the non-selectable state, the worker is capable of confirming the operation conditions which are necessary to switch to the selectable state. Therefore, it is not necessary for the worker to purposely refer to a manual or the like in order to confirm the necessary operation conditions. It is not necessary for the worker to purposely push the software button on the touch panel in order to confirm the necessary operation conditions. Therefore, according to the work machine display device of the present disclosure, it is possible to improve the usability of the work machine.

(2) In the configuration of (1) described above, it is preferable to adopt a configuration in which the operation condition is displayed on the touch panel in icon format. According to this configuration, the worker is capable of easily confirming the operation conditions which are necessary for selecting the desired software button regardless of country or language. It is possible to reduce the display space that the operation conditions occupy on the touch panel in comparison to a case in which the operation conditions are displayed on the touch panel in a text format (naturally, this case is also included in the configuration described above in (1)).

(3) In the configuration of (1) or (2) described above, it is preferable to adopt a configuration in which at least a portion of the operation condition is displayed to be overlaid on the software button. According to this configuration, it is possible to reduce the display space that the operation conditions occupy on the touch panel in comparison to a case in which the software buttons and the operation conditions are arranged adjacently on the touch panel (naturally, this case is also included in the configuration described above in (1)). According to this configuration, in a case in which a plurality of software buttons are displayed on the touch panel, the worker may easily associate the desired software button with the operation conditions which are necessary for the software button.

Effects

It is possible to provide a work machine display device capable of improving the usability of a work machine.

DESCRIPTION OF EMBODIMENTS

Hereinafter, description will be given of the embodiments of the work machine display device of the present disclosure.

Configuration of NC Machine Tool

Figure 1:
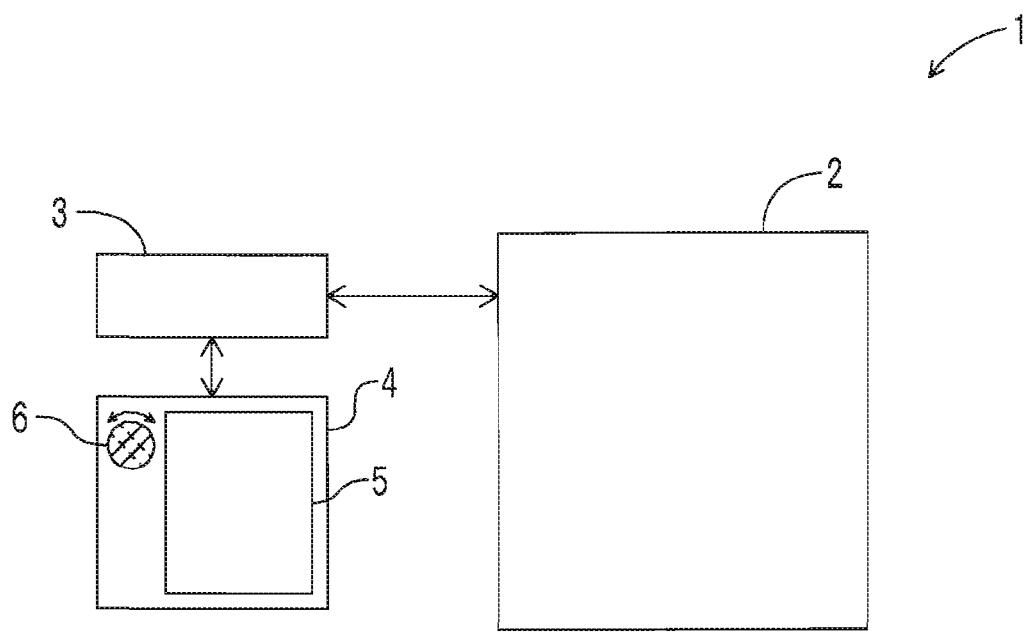
FIG. 1 is a block diagram of an NC machine tool which is provided with a work machine display device of an embodiment of the present disclosure.

First, description will be given of the configuration of the NC machine tool which is provided with the work machine display device of the present embodiment. FIG. 1 illustrates a block diagram of the NC machine tool. As illustrated in FIG. 1, an NC machine tool 1 is provided with a work machine 2, a control device 3, and a work machine display device 4.

The work machine 2 subjects a work (not illustrated) to predetermined processing. The control device 3 controls the work machine 2. The work machine display device 4 is electrically connected to the control device 3. The work machine display device 4 is disposed on the outer surface of a housing of the work machine 2. The work machine display device 4 is a so-called operation panel. The work machine display device 4 is provided with a touch panel 5 and a selection switch 6. A worker is capable of confirming information of the work machine 2 via the touch panel 5 and the control device 3. The worker is capable of operating the work machine 2 via the touch panel 5 and the control device 3. By turning the selection switch 6 to the left and the right, the worker is capable of switching a program for the work machine 2 between an editable state and a non-editable state. In order to turn the selection switch 6, it is necessary to insert a predetermined key (not illustrated) into a keyhole (not illustrated) of the selection switch in advance.

Touch Panel

Figure 2:
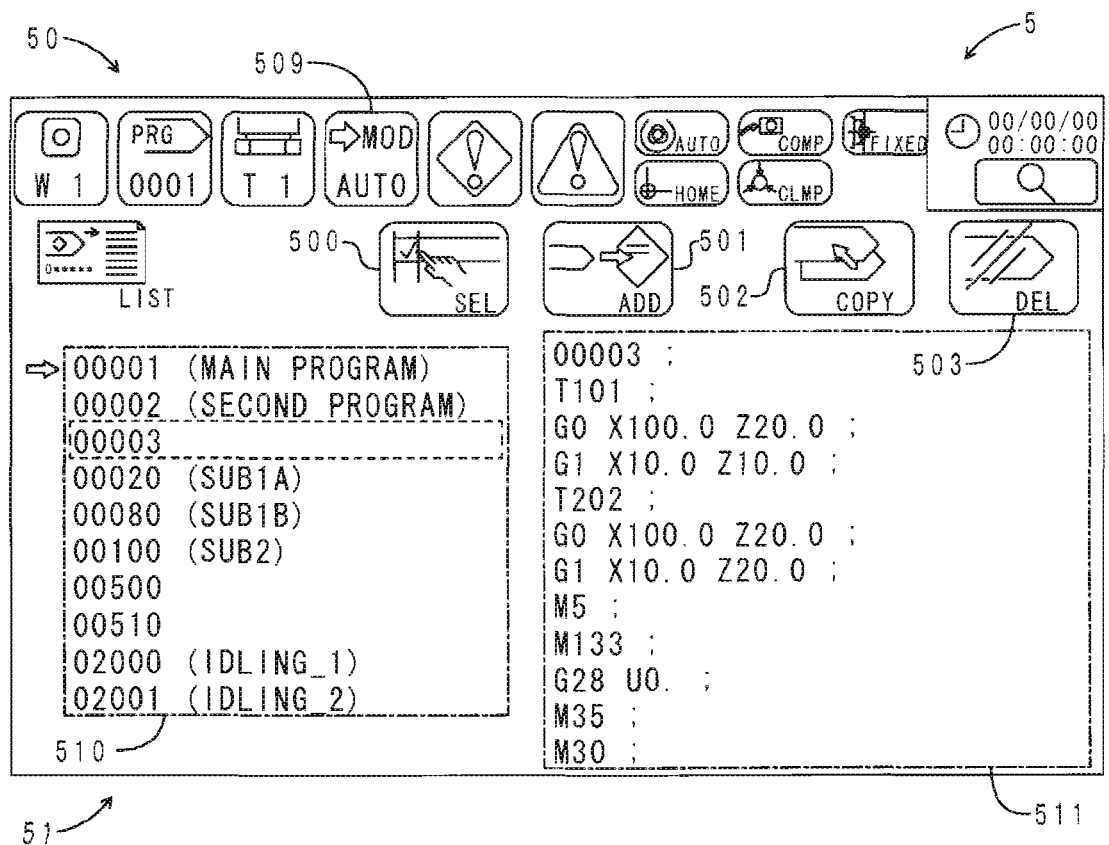
FIG. 2 is a (first) schematic diagram of a touch panel of the work machine display device.

Next, description will be given of the touch panel. FIG. 2 illustrates a (first) schematic diagram of the touch panel of the work machine display device of the present embodiment. FIG. 2 illustrates a case in which software buttons (a program selection button 500, a program addition button 501, a program copy button 502, and a program deletion button 503) are in a selectable state.

Here, the selectable state refers to a state in which, by pushing (touching) each software button, the worker is capable of inputting a command corresponding to the software button to the NC machine tool 1. Conversely, the non-selectable state refers to a state in which, even if each software button is pushed (even if each software button is touched), the worker is not capable of inputting a command corresponding to the software button to the NC machine tool 1.

As illustrated in FIG. 2, the control device 3 is capable of displaying an icon section 50 and a list section 51 on the touch panel 5. A plurality of icons are arranged into two levels, an upper level and a lower level, in the icon section 50. Of these, the program selection button 500, the program addition button 501, the program copy button 502, and the program deletion button 503 are arranged in the lower level.

The worker is capable of selecting a desired program from among a list display field 510 which is described later by pushing (touching) the program selection button 500. For example, the worker is capable of selecting a "program 00003".

The worker is capable of newly adding a program number by pushing (touching) the program addition button 501. Specifically, when the worker pushes the program addition button 501, the control device 3 displays a number pad (not illustrated) on the touch panel 5. Using the number pad, the worker is capable of newly adding a program number. For example, when the worker uses the number pad to newly add a program number "00009", the control device 3 creates and saves an empty (yet to be input) "program 00009".

The worker is capable of copying a selected program by pushing (touching) the program copy button 502. Specifically, when the worker pushes the program copy button 502, the control device 3 displays a number pad on the touch panel 5. Using the number pad, the worker is capable of inputting program numbers of a copy source and a copy destination. For example, when the worker uses the number pad to input the program number "00003" of a copy source and to input the program number "00009" of a copy destination, the control device 3 creates and saves the "program 00009" with the same content as the "program 00003".

The worker is capable of deleting a selected program by pushing (touching) the program deletion button 503. Specifically, when the worker pushes the program deletion button 503, the control device 3 displays a number pad on the touch panel 5. Using the number pad, the worker is capable of inputting a program number which the worker wishes to delete. For example, when the worker uses the number pad to input the program number "00003" which the worker wishes to delete, the control device 3 displays a confirmation message (for example, "really delete?", "the deleted program may not be restored", or the like), and intention declaration buttons in relation to the confirmation message (for example, an approval button ("yes", "execute", or the like), a deny button ("no", "cancel", or the like)) on the touch panel 5. Among the intention declaration buttons, when the worker pushes (touches) the confirmation button, the control device 3 deletes the "program 00003".

The list section 51 is arranged below the icon section 50. The list section 51 is provided with the list display field 510 and a program display field 511. A list of programs for work processing is displayed in the list display field 510. The content of the "program 00003" which is selected in the list display field 510 is displayed in the program display field 511.

To facilitate the description, in FIG. 2, the selected "program 00003" is surrounded with a dotted line box. In actuality, in the selected "program 00003", in comparison to a "program 00002" which is not selected, or the like, white is converted to black. Additionally, black is converted to gray. Therefore, the worker may easily confirm the selected program.

Figure 3:
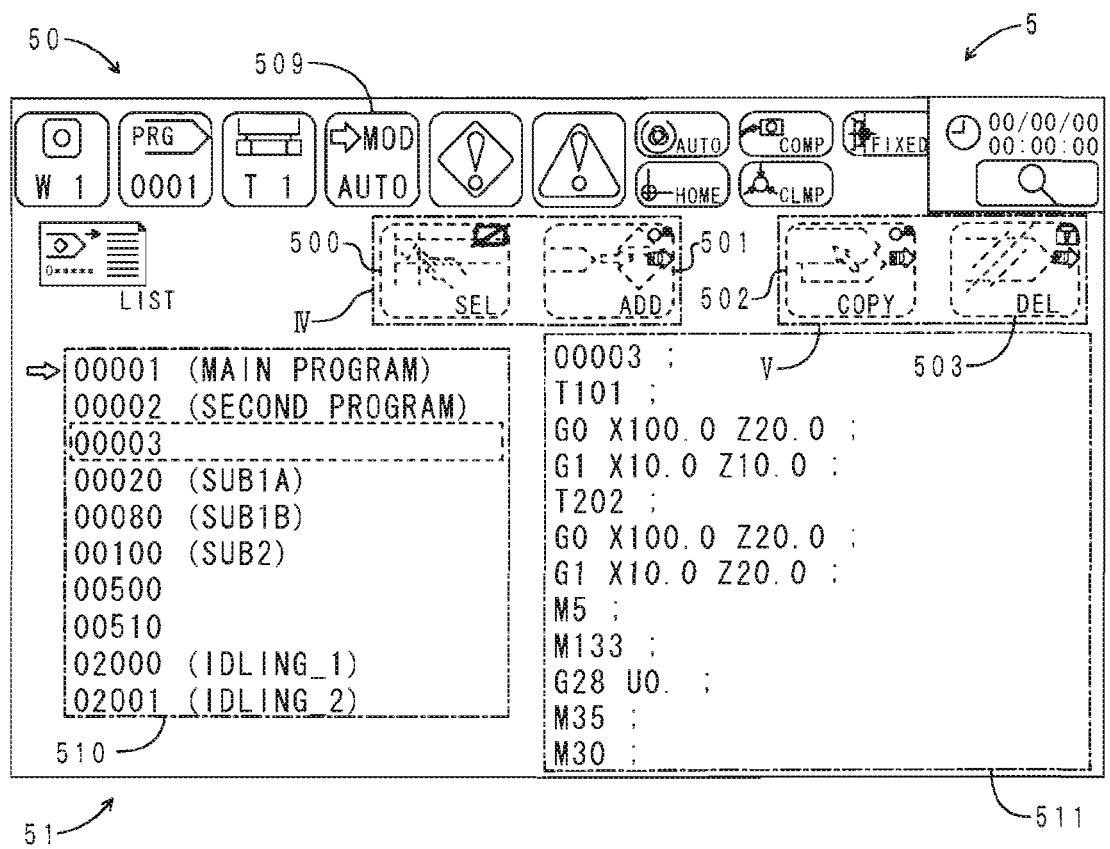
FIG. 3 is a (second) schematic diagram of a touch panel of the work machine display device.
Figure 4:
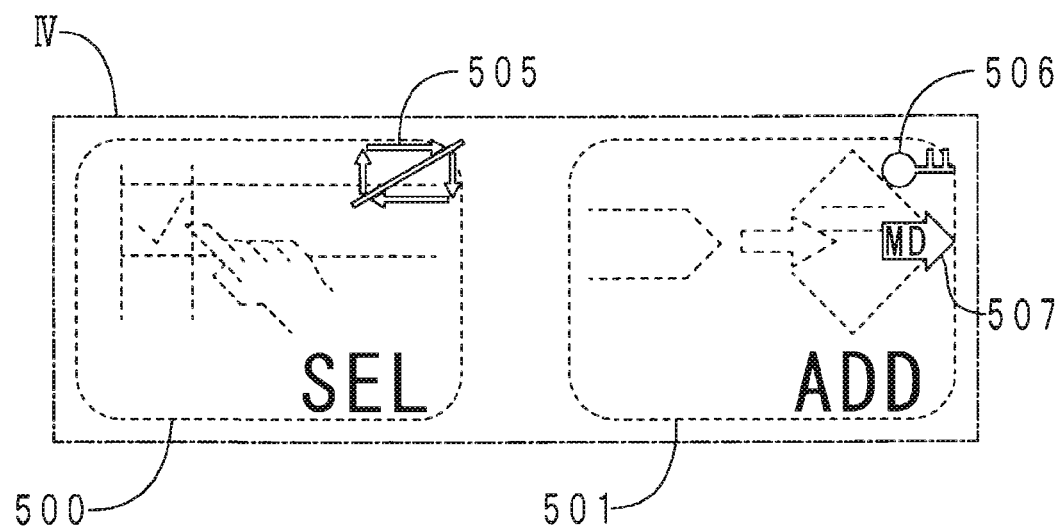
FIG. 4 is an enlarged view of the inside of box IV of FIG. 3.
Figure 5:
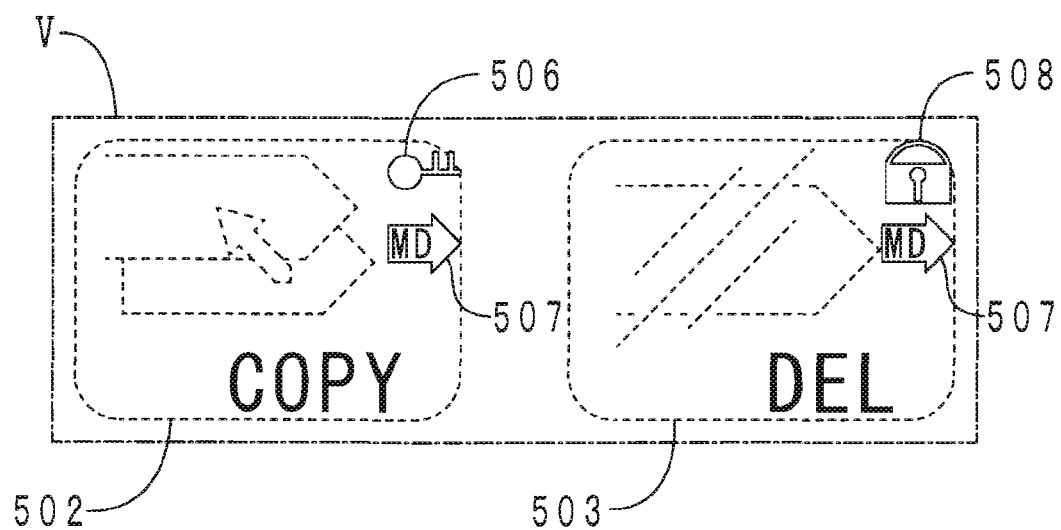
FIG. 5 is an enlarged view of the inside of box V of FIG. 3.

FIG. 3 illustrates a (second) schematic diagram of the touch panel of the work machine display device of the present embodiment. FIG. 4 illustrates an enlarged view of the inside of box IV of FIG. 3. FIG. 5 illustrates an enlarged view of the inside of box V of FIG. 3. FIGS. 3 to 5 illustrate a case in which the software buttons (the program selection button 500, the program addition button 501, the program copy button 502, and the program deletion button 503) are in a non-selectable state.

To facilitate the description, in FIGS. 3 to 5, the software buttons (the program selection button 500, the program addition button 501, the program copy button 502, and the program deletion button 503) which are in a non-selectable state are illustrated using dotted lines. In actuality, in regard to the software buttons, when comparing the selectable state illustrated in FIG. 2 to the non-selectable state illustrated in FIGS. 3 to 5, the selectable state (FIG. 2) has a greater shade contrast in gray-scale display than the non-selectable state (FIGS. 3 to 5).

Operation condition icons are overlaid on the upper right corner portions of the software buttons. The overlaid operation condition icons indicate operation conditions of the software buttons. For example, as illustrated in FIG. 4, a stop operation icon 505 is overlaid on the upper right corner portion of the program selection button 500. The stop operation icon 505 indicates an operation condition "stop operation of the work machine 2". By confirming the stop operation icon 505, the worker may recognize that the program selection button 500 will enter the selectable state (FIG. 2) if the operation of the work machine 2 is stopped.

As illustrated in FIG. 4, an edit key icon 506 and an NC mode icon 507 are overlaid on the upper right corner portion of the program addition button 501. The edit key icon 506 indicates an operation condition "switch the selection switch 6 to the editable state using a key". The NC mode icon 507 indicates an operation condition "switch the mode of the NC machine tool 1 from automatic mode (refer to a mode switch icon 509 of FIG. 3) to edit mode". By confirming the edit key icon 506 and the NC mode icon 507, the worker may recognize that the program addition button 501 will enter the selectable state (FIG. 2) if the selection switch 6 is switched to the editable state using a key, and the mode of the NC machine tool 1 is switched to the edit mode.

As illustrated in FIG. 5, the edit key icon 506 and the NC mode icon 507 are also overlaid on the upper right corner portion of the program copy button 502 in the same manner as the program addition button 501.

As illustrated in FIG. 5, a password input icon 508 and the NC mode icon 507 are overlaid on the upper right corner portion of the program deletion button 503. The password input icon 508 indicates an operation condition "input password". By confirming the password input icon 508 and the NC mode icon 507, the worker may recognize that the program deletion button 503 will enter the selectable state (FIG. 2) if the number pad is displayed on the touch panel 5, a password is input via the number pad, and the mode of the NC machine tool 1 is switched to the edit mode.

Operation Method of Touch Panel

Figure 6:
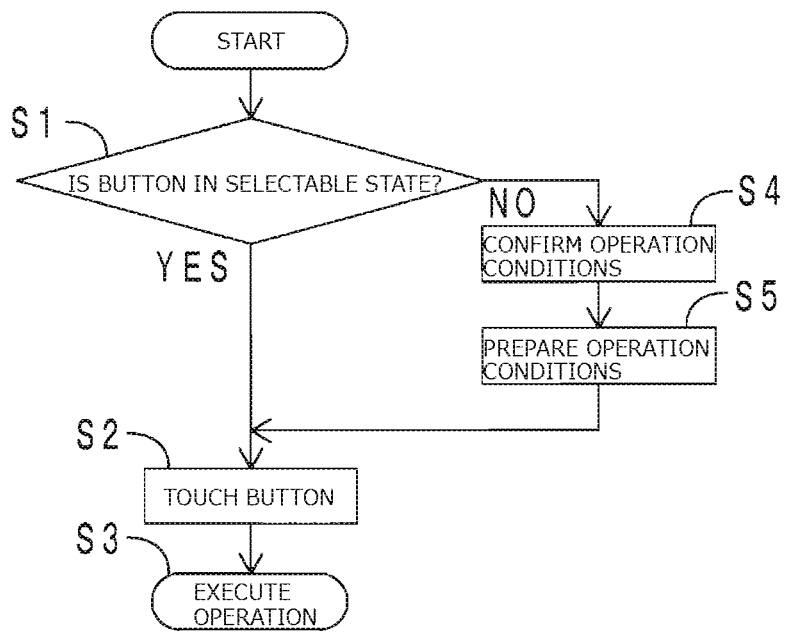
FIG. 6 is a flowchart of an operation method of the touch panel.

Next, description will be given of the operation method of the touch panel. FIG. 6 illustrates a flowchart of the operation method of the touch panel. First, the worker confirms whether the desired software button (the program selection button 500, the program addition button 501, the program copy button 502, or the program deletion button 503) is in the selectable state (FIG. 2) or, alternatively, in the non-selectable state (FIGS. 3 to 5) (S1 (step 1, same hereinafter) of FIG. 6).

In step 1, in a case in which the desired software button is in the selectable state (FIG. 2), the worker touches the software button (S2 of FIG. 6). The control device 3 illustrated in FIG. 1 executes the command corresponding to the software button which is touched by the worker (S3 of FIG. 6).

In step 1, in a case in which the desired software button is in the non-selectable state (FIGS. 3 to 5), the worker confirms the operation conditions (S4 of FIG. 6). Specifically, the worker confirms the operation condition icon (the stop operation icon 505, the edit key icon 506, the NC mode icon 507, or the password input icon 508) which overlaps the upper right corner portion of the software button. Next, the worker readies the operation conditions based on the operation condition icons corresponding to the desired software button (S5 of FIG. 6). When the operation conditions are ready, the control device 3 illustrated in FIG. 1 removes the operation condition icons from the upper right corner portion of the software button. The control device 3 switches the software button from the non-selectable state (FIGS. 3 to 5) to the selectable state (FIG. 2). The worker touches the software button (S2 of FIG. 6). The control device 3 executes the command corresponding to the software button which is touched by the worker (S3 of FIG. 6).

Operations and Effect

Next, description will be given of the operations and effects of the work machine display device of the present embodiment. According to the work machine display device 4 of the present embodiment, as illustrated in FIGS. 3 to 5, in the non-selectable state, it is possible to display the software buttons (the program selection button 500, the program addition button 501, the program copy button 502, and the program deletion button 503), and the operation condition icons (the stop operation icon 505, the edit key icon 506, the NC mode icon 507, and the password input icon 508) at the same time on the touch panel 5. In addition, it is possible to display the software buttons and the operation condition icons in an interrelated state.

The worker is capable of confirming the state (the selectable state (FIG. 2) or the non-selectable state (FIGS. 3 to 5)) of a desired software button by merely viewing the touch panel 5. At the same time, in a case in which the desired software button is in the non-selectable state (FIGS. 3 to 5), the worker is capable of confirming the operation conditions which are necessary to switch to the selectable state (FIG. 2) by viewing the operation condition icons. Therefore, it is not necessary for the worker to purposely refer to a manual or the like in order to confirm the necessary operation conditions. It is not necessary for the worker to purposely push the software button on the touch panel 5 in order to confirm the necessary operation conditions. Therefore, according to the work machine display device 4 of the present embodiment, it is possible to improve the usability of the work machine 2.

As illustrated in FIGS. 3 to 5, the operation conditions of the software buttons are displayed on the touch panel 5 as the operation condition icons. Therefore, the worker is capable of easily confirming the operation conditions which are necessary for selecting the desired software button regardless of country or language. It is possible to reduce the display space that the operation conditions occupy in the touch panel 5 in comparison to a case in which the operation conditions are displayed on the touch panel 5 in a text format.

As illustrated in FIGS. 3 to 5, the entirety of the operation condition icons overwrite the upper right corner portion of the software buttons. Therefore, in comparison to a case in which the software buttons and the operation condition icons are arranged adjacently on the touch panel 5, it is possible to reduce the display space that the operation condition icons occupy on the touch panel 5. The worker may easily associate the desired software button with the operation condition icons which are necessary for the software button even though a plurality of software buttons are displayed on the touch panel 5.

Other

Hereunto, description is given of an embodiment of the work machine display device of the present disclosure. However, the embodiment is not particularly limited to the above. It is possible to embody in various modified modes and improved modes which a person skilled in the art is capable of carrying out.

Figure 7:
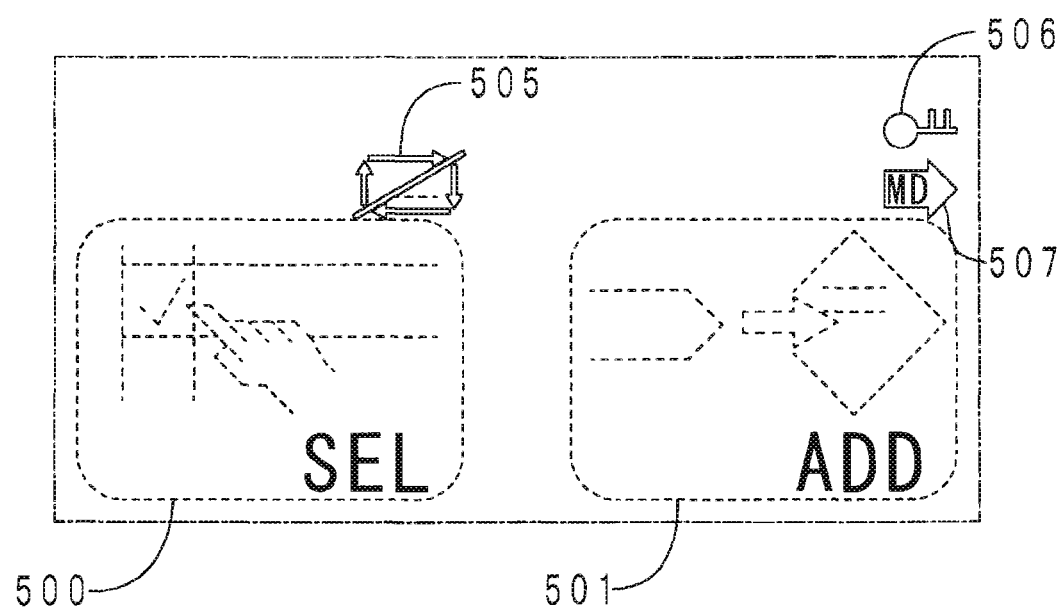
FIG. 7 is an enlarged view of a portion of the touch panel of the work machine display device of a (first) other embodiment.

FIG. 7 illustrates an enlarged view of a portion of the touch panel of the work machine display device of a (first) other embodiment. The same signs will be used for parts corresponding to those of FIG. 4. As illustrated in FIG. 7, the software buttons (the program selection button 500 and the program addition button 501), and the operation condition icons (the stop operation icon 505, the edit key icon 506, and the NC mode icon 507) for setting the software buttons to the selectable state may be arranged to be adjacent in the vertical direction. A portion of the software button and the operation condition icon may be allowed to overlap. The software button and the operation condition icon may be allowed to be in contact. In other words, in a case in which a plurality of software buttons and a plurality of operation condition icons are arranged on the touch panel, the worker may visually relate the desired software button to the operation condition icons for setting the software button to the selectable state.

Figure 8:
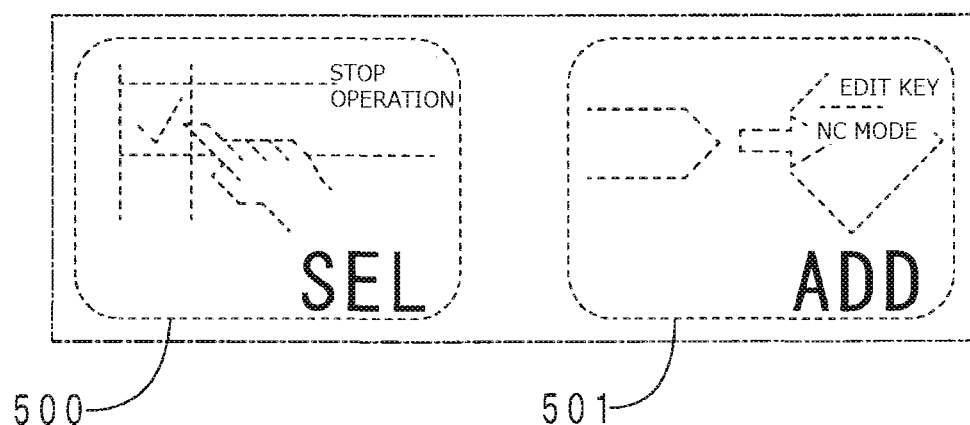
FIG. 8 is an enlarged view of a portion of the touch panel of the work machine display device of a (second) other embodiment.

FIG. 8 illustrates an enlarged view of a portion of the touch panel of the work machine display device of a (second) other embodiment. The same signs will be used for parts corresponding to those of FIG. 4. As illustrated in FIG. 8, the operation conditions may be displayed using text. In this case, in comparison to a case in which the operation conditions are displayed on the touch panel as the operation condition icons, it is not necessary for the worker to remember the meaning of the operation condition icons.

Figure 9:
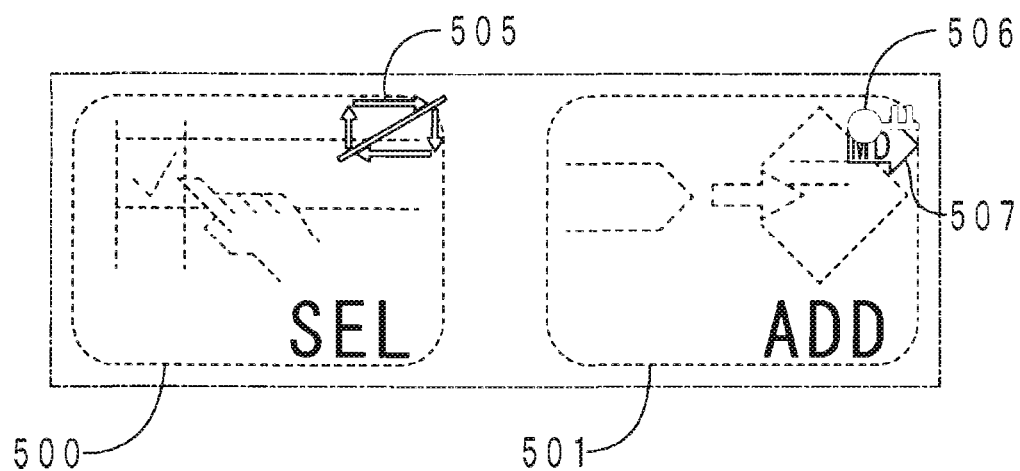
FIG. 9 is an enlarged view of a portion of the touch panel of the work machine display device of a (third) other embodiment.

FIG. 9 illustrates an enlarged view of a portion of the touch panel of the work machine display device of a (third) other embodiment. The same signs will be used for parts corresponding to those of FIG. 4. As illustrated in FIG. 9, two operation condition icons (the edit key icon 506 and the NC mode icon 507) may be overlaid on a software button (the program addition button 501). In this case, the operation condition icons may be overlaid from top to bottom according to the operation order. For example, in a case in which it is necessary to perform an operation relating to the edit key icon 506 before performing an operation relating to the NC mode icon 507, the edit key icon 506 of the top side may be stacked and displayed on the NC mode icon 507 of the bottom side. Here, in a case in which a plurality of operation condition icons are displayed on a single software button, the worker may easily confirm the order of operations relating to the plurality of operation condition icons. Naturally, the vertical arrangement of the plurality of operation condition icons may be set without relation to the operation order.

Each of the control device 3 and the work machine display device 4 illustrated in FIG. 1 may be a PC (Personal Computer) which is externally attached to the NC machine tool 1, a tablet PC, a laptop, a smart phone, a mobile phone, a PDA (Personal Digital Assistant), or the like.

The display method of the selectable state illustrated in FIG. 2 and the non-selectable state illustrated in FIGS. 3 to 5 is not particularly limited. The selectable state and the non-selectable state may be depicted distinctly using a difference in the color (hue, brightness, saturation, or any combination thereof) of the software buttons, a difference in the size of line rendering of the software, a difference in the type of line rendering (solid lines, dotted lines, dot-and-dash lines, and the like) of the software buttons, a difference in the width of line rendering (thick lines, thin lines, and the like) of the software buttons, or the like. In other words, the worker may view the software button and distinguish the selectable state from the non-selectable state.

When the operation conditions relating to the desired software button are ready, the control device 3 may change the state of the operation condition icons corresponding to the operation conditions. For example, when the operation conditions relating to the desired software button are ready, the control device 3 may remove the operation condition icons. Specifically, the control device 3 may gradually remove the operation condition icons. The control device 3 may remove the operation condition icons after causing the operation condition icons to blink. The control device 3 may remove the operation condition icons while reducing the size of the display surface area of the operation condition icons.

When the operation conditions relating to the desired software button are ready, the control device 3 may reduce the size of the display surface area of the operation condition icons corresponding to the operation conditions. The control device 3 may move the operation condition icons from a predetermined position to another position. The control device 3 may change the color, line type, and contrast of the operation condition icons. In this case, the worker is capable of easily and visually confirming that the operation conditions are ready.

The type of the work machine 2 illustrated in FIG. 1 is not particularly limited. The work machine 2 may be a machine tool (a machining center, a lathe, a miller, a drill press, or a milling cell) which processes a work, a screen printer which prints solder onto a board, an electronic component mounting machine which mounts electronic components onto a printed circuit board, or the like. The electrical connection between the work machine 2 and the control device 3 illustrated in FIG. 1, and the electrical connection between the control device 3 and the work machine display device 4 may each be either wired or wireless.

REFERENCE SIGNS LIST

1: NC machine tool, 2: work machine, 3: control device, 4: work machine display device, 5: touch panel, 6: selection switch, 50: icon section, 51: list section, 500: program selection button (software button), 501: program addition button (software button), 502: program copy button (software button), 503: program deletion button (software button), 505: stop operation icon, 506: edit key icon, 507: NC mode icon, 508: password input icon, 509: mode switch icon, 510: list display field, 511: program display field.

The invention claimed is:

1. A work machine display device for a numerical control (NC) machine tool, the work machine display device comprising:
 a touch panel of the work machine display device of the NC machine tool configured to display a software button and a plurality of operation condition indicia, the software button configured to be displayed in both a selectable state and a non-selectable state, wherein
 responsive to the software button entering the non-selectable state, the touch panel automatically and simultaneously displays at least one operation condition indicia of the plurality of operation condition indicia in interrelation with the software button in a common display area, each displayed operation condition indicia being a representation of an action that must take place for a corresponding operation condition of the work machine to be placed in a ready state,
 when each corresponding operation condition is in the ready state, the software button is displayed in the selectable state,
 wherein each of the operation condition indicia is in the form of an icon that graphically represents the action that must take place for a corresponding operation condition of the work machine to be placed in a ready state.

2. The work machine display device for a numerical control (NC) machine tool according to claim 1, wherein the at least one operation condition indicia is displayed on the touch panel as an icon representation of the action.

3. The work machine display device for a numerical control (NC) machine tool according to claim 1, wherein at least a portion of the at least one operation condition indicia is displayed to be overlaid on the software button such that a portion of the software button is still viewable.

4. The work machine display device for a numerical control (NC) machine tool according to claim 1, wherein the at least one operation condition indicia is displayed adjacent to the software button.

5. The work machine display device for a numerical control (NC) machine tool according to claim 1, wherein:
for each corresponding operation condition placed in the ready state, a display state of the corresponding operation condition indicia is changed.

6. The work machine display device for a numerical control (NC) machine tool according to claim 5, wherein:
when the corresponding operation condition is placed in the ready state, the corresponding operation condition indicia is removed from the display.

7. The work machine display device for a numerical control (NC) machine tool according to claim 6, wherein a display surface area of the corresponding operation condition indicia is reduced while the corresponding operation condition indicia is removed from the display.

8. The work machine display device for a numerical control (NC) machine tool according to claim 6, wherein
at least a portion of the at least one operation condition indicia is displayed to be overlaid on the software button such that a portion of the software button is still viewable, and
the touch panel is configured to remove the at least one operation condition indicia from the common display area and display the entirety of the software button when the corresponding operation condition is placed in the ready state.

9. The work machine display device for a numerical control (NC) machine tool according to claim 6, wherein the touch panel is configured to:
display the software button in a first area of the common display area,
display the at least one operation condition indicia in a second area of the common display area that is adjacent to the software button, and
display nothing in the second area when the corresponding operation condition is placed in the ready state.

10. The work machine display device for a numerical control (NC) machine tool according to claim 1, wherein the selectable state of the software button is visibly distinguishable from the non-selectable state of the software button.

11. The work machine display device for a numerical control (NC) machine tool according to claim 1, wherein the at least one operation condition indicia is displayed on the touch panel along with a text representation of the action that must take place for a corresponding operation condition of the work machine to be placed in a ready state.

12. The work machine display device for a numerical control (NC) machine tool according to claim 1, wherein:
when the touch panel displays at least two operation condition indicia of the plurality of operation condition indicia, the at least two operation condition indicia are overlaid from top to bottom according to an operation order.

13. The work machine display device for a numerical control (NC) machine tool according to claim 12, wherein the operation order is an order in which respective actions must take place.

14. The work machine display device for a numerical control (NC) machine tool according to claim 12, wherein a top operation condition indicia of the at least two operation condition indicia visually overlaps a bottom operation condition indicia of the at least two operation condition indicia.

15. The work machine display device for a numerical control (NC) machine tool according to claim 14, wherein the operation order is an order in which respective actions must take place.

16. The work machine display device for a numerical control (NC) machine tool according to claim 1, wherein the action is different from a function that is selectable by the software button in the selectable state.

17. The work machine display device for a numerical control (NC) machine tool according to claim 1, wherein the touch panel is configured to:
display the software button in a first area of the common display area,
display an icon representation of the action in a second area of the common display area, and
display a text representation of the action in the second area of the common display area.

18. The work machine display device for a numerical control (NC) machine tool according to claim 1,
wherein the touch panel is configured to display an additional software button and one or more of the operation condition indicia associated with the additional software button, the additional software button being configured to be displayed in both the selectable state and the non-selectable state,
wherein the touch panel is configured to display the additional software button at the same time as said software button,
wherein, responsive to the additional software button entering the non-selectable state, the touch panel automatically and simultaneously displays at least one operation condition indicia of the one or more operation condition indicia in interrelation with the additional software button in the common display area,
when each corresponding operation condition is in the ready state, the additional software button is displayed in the selectable state, and
wherein said software button is to output a first command to perform a first operation for a work machine of the NC machine tool and said additional software button is to output a second command to perform a second operation for the work machine of the NC machine tool different from the first operation.

* * * * *